April 12, 1932. G. M. PELTZ ET AL 1,853,835
MECHANICAL OVERLOAD RELEASE
Filed July 13, 1929  2 Sheets-Sheet 2
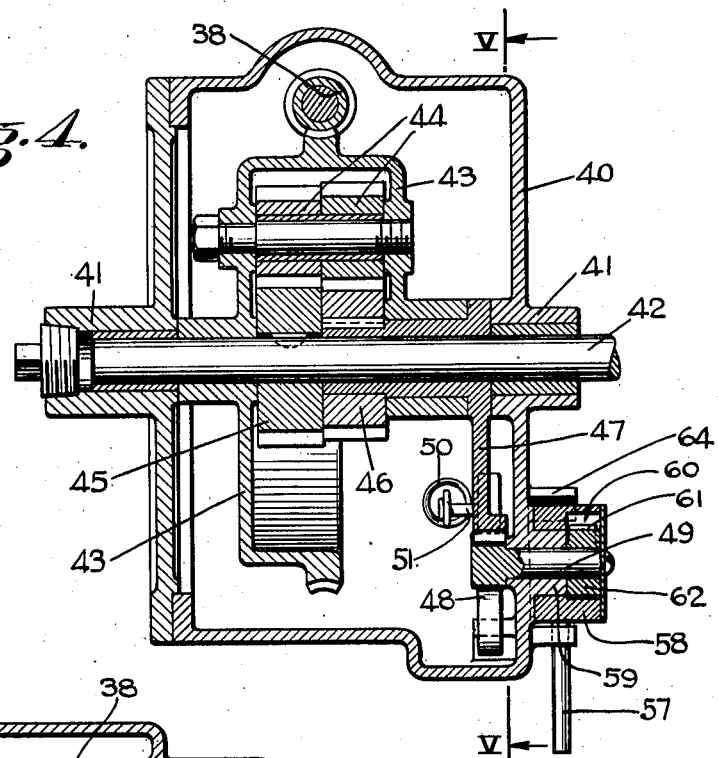
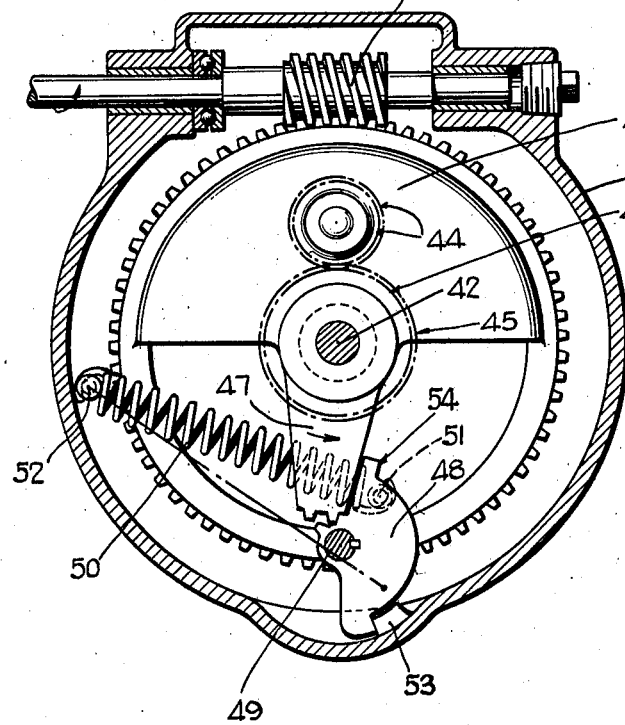
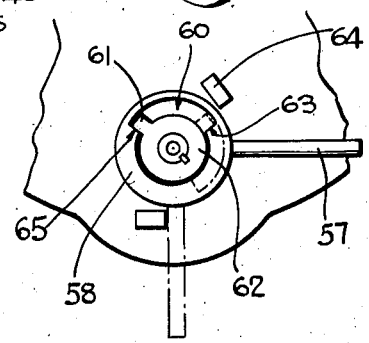
INVENTORS.
ATTORNEYS.

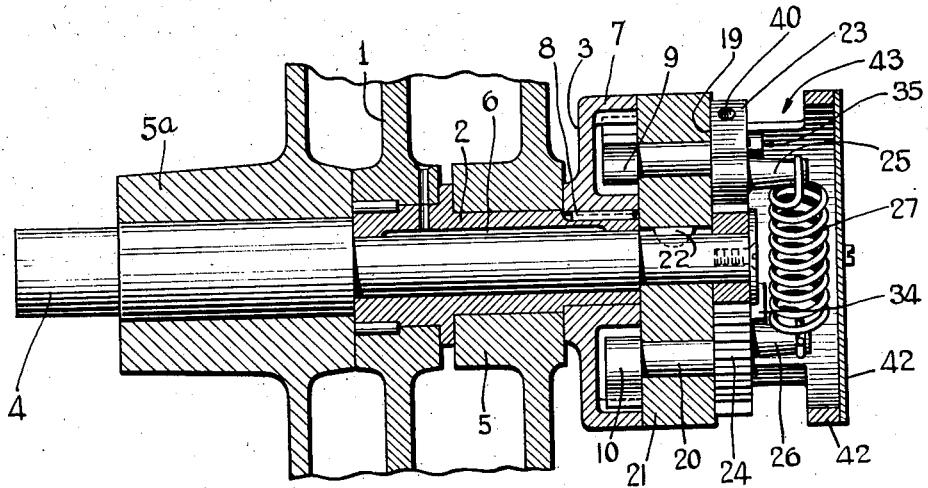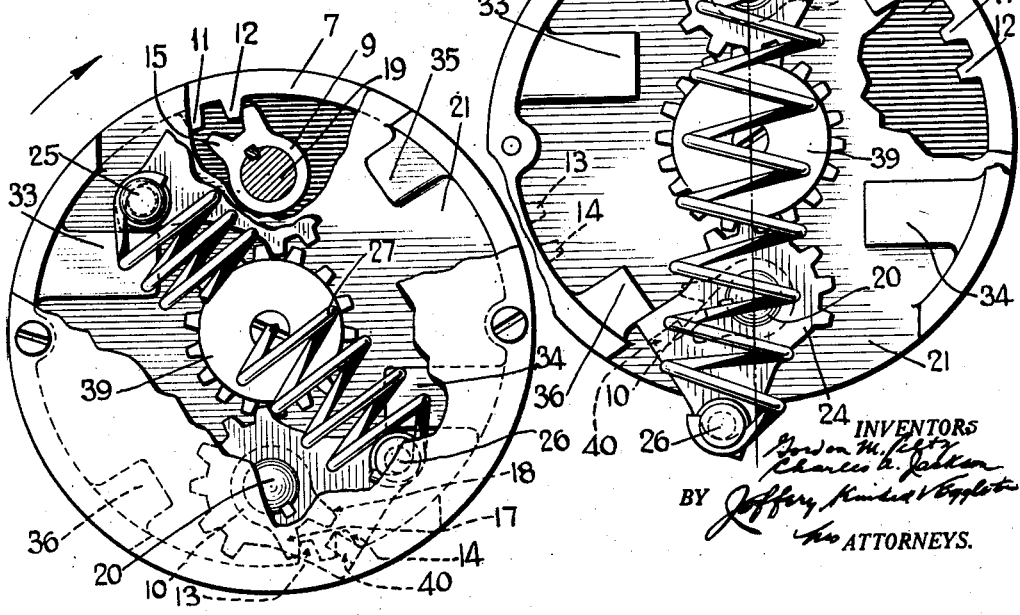

Patented Apr. 12, 1932

1,853,835

UNITED STATES PATENT OFFICE

GORDON M. PELTZ, OF ELMHURST, NEW YORK, AND CHARLES A. JACKSON, OF RIDGE-WOOD, NEW JERSEY, ASSIGNORS TO AUTOMATIC COAL BURNER COMPANY, OF SEATTLE, WASHINGTON, A CORPORATION OF WASHINGTON

MECHANICAL OVERLOAD RELEASE

Application filed July 13, 1929. Serial No. 377,995.

Our invention relates to apparatus serving to release a driven device from its driving device when the load on the driven side exceeds a predetermined value; as, for example, when the free movement of a driven element is interfered with to such an extent that the machine itself, or associated apparatus or devices may be damaged if the driving device continues driving or trying to drive the driven element. Furthermore, our invention relates to what may be termed the positively-coupled type of such apparatus. That is to say, that type in which the driving connection is made through or otherwise maintained by a dog, tooth, gear, or other positive coupling member or members which is, or are, displaceable to break the power-transmitting connection between the driving and driven devices, rather than to the automatically-releasing friction-clutch type of mechanical releases.

Either one coupling member, or more than one, may be employed in each release mechanism, depending on the circumstances and the choice of the designer. Hereinafter however we shall frequently refer to but one coupling member (using the singular number only), in order to simplify the description. Hence when we use the singular number it will be understood that we include release apparatus having two or more coupling members as well as those having but a single coupling member, except where the contrary may appear.

The primary object of our invention is to provide an improved mechanical overload release apparatus of the type indicated.

In devices of our invention, we employ yielding mechanism to support the coupling member against the thrust on the coupling member, and (at least preferably) to urge the coupling member in the opposite direction, that is to say, out of or away from its normal coupling position, whenever the thrust displaces the coupling member to some certain position away from this normal coupling position. This mechanism imposes only sufficient supporting load on the coupling member to resist the thrust imposed thereon by the maximum permissible load, and hence the coupling member yields, and is displaced, when this maximum is exceeded.

Preferably too the supporting mechanism is so arranged or is so related to the coupling member (or both) that it unloads the coupling member as the coupling member is displaced toward this point. Thereby, in a relatively simple device, the power-transmitting connection between the driving and driven devices may be ruptured without imposing any great or concentrated stress on the coupling member or the thrust-resisting or thrust-imposing member cooperating therewith, and the disconnection, once made, is maintained until the coupling member is deliberately replaced again, manually or otherwise. The coupling member may be a part of and move bodily with either the driven or the driving device, or it may be carried on a fixed member, acting then, for example, in operation, as a stop or movement-preventing abutment for some part of either the driving or the driven device. Specific examples of both these forms are illustrated in the accompanying drawings and are described hereinafter.

Another object of our invention is to provide an improved overload release suitable for rotary movement, as will be understood from the specific forms of our invention herein illustrated and described.

Another is to provide a combined overload release and speed reducing gearing as will also be understood from the following description of a specific form of our invention.

A still further object of our invention is to provide means for replacing the coupling member in power-transmitting position in devices of the type indicated, which is of such a nature that the coupling member can not be readily held in power-transmitting position while the driven devices are subject to overload conditions.

Our improvements appear more specifically in certain devices embodying them hereinafter described and in the claims which follow thereafter.

In the accompanying drawings wherein specific forms of our invention are illustrated, Fig. 1 is a section of a device embodying our invention. Fig. 2 an end elevation of the same, the parts being in coupling or power-transmitting position, a part of the cap and likewise a part of the sub-base being broken away to show details of the mechanism. Fig. 3 is a generally similar elevation showing the parts in uncoupled position. Fig. 4 is a section of a combined speed-changing-and-overload-release mechanism of our invention. Fig. 5 is another sectional view of the latter, on the line V—V of Fig. 4. Fig. 6 is a detail of the coupling-replacing means of our invention, which is also shown in Fig. 4.

Referring first to the device of Figs. 1, 2 and 3: Although the apparatus is reversible and the driving side at one time may be the driven side at another, the members 1, 2 and 3 will be regarded as constituting the driver or driving device for the purposes of this description, and the shaft 4 as a driven element or device driven thereby. The member 1 may be regarded as a driven gear wheel or pulley. This is keyed to the hollow shaft 2 supported by the bearing 5 and containing the driven shaft 4 which is further supported by bearing 5ª. It will become apparent that this placement of the driven within the driving element is not altogether an essential detail of the invention; however on the other hand, this arrangement tends to a compact form of device which is peculiarly suited to certain particular situations. 6 is simply an oil groove. The circular member 3 carrying the annular flange 7 is keyed at 8 to the driving shaft 2, and constitutes the member which engages with the coupling member in this instance, or rather with the coupling members since there are two coupling members in the particular mechanism here illustrated. One alone would serve however, or more than two might be employed, as will become apparent. For engagement with the coupling members, the flange 7 bears two pairs of internal gear teeth 11 and 12, and 13 and 14, which mesh respectively with the gear teeth 15 and 16, and 17 and 18, of the coupling dogs 9 and 10 of the coupling members; these dogs preferably have the form of toothed sectors for reasons appearing hereinafter. These sectors 9 and 10 are keyed to the stub shafts 19 and 20 respectively, which are mounted in the sub-base 21, the latter being keyed at 22 to the driven shaft 4. Cranks 23 and 24 are fastened to the opposite ends of the stub shafts 19 and 20. A loading, holding and operating spring or springs for the coupling members, is or are attached to the crank pins 25 and 26 of the cranks respectively. A single coil spring 27 may be employed for both of the coupling members, its opposite ends being connected to the two cranks; this is the preferred arrangement where more than one coupling member is employed. Each crank pin and its spring are so placed and related that from some certain point or position to which the member 3—7 is capable of carrying the respective coupling member as the spring yields under overload, the spring is capable of turning the coupling member both toward normal coupling position and to uncoupling position. Thus the crank pins 25 and 26 are so located that when they are respectively to the right and to the left of the line 32 passing through the axes of rotation of the shafts 19 and 20, the spring 27 acts in a direction to turn both of the coupling members in the clockwise direction, as viewed from Figs. 2 and 3; likewise, when the crank pins 25 and 26 are respectively to the left and to the right of this line 32, the spring 27 tends to turn the coupling members in the counter-clockwise direction. Stops 33 and 34, engageable by the cranks 23 and 24 respectively, limit the rotation of the coupling members in the coupling direction, to that position in which the coupling members are in normal coupling position as shown in Fig. 2; that is to say, those positions in which power is normally transmitted from the driving wheel 1 to the driven shaft 4. Similarly stops 35 and 36, placed to be struck by the cranks 23 and 24, limit the rotation of the coupling members in the opposite direction to some position (with the crank pins 25 and 26 at the right and the left of the line 32) where the teeth on the sectors 9 and 10 are completely out of the path of the teeth on the cooperating flange 7.

For convenience in returning the coupling members to coupling or power-transmitting position, a gear wheel 39 is provided, loose at the end of the shaft 4, and with this mesh teeth added to the cranks 23 and 24; a recess 40 in the crank 23 is provided for the admission of a pin. By inserting a pin in the recess 40 and therewith turning the crank 23, it is obvious that both coupling members can be returned simultaneously from their uncoupled positions of Fig. 3 to their coupling positions of Fig. 2. Flange 41 and cap 42 constitute a closure for the apparatus as will be apparent; the opening 43 in flange 41 permits the use of the replacing pin in the recess 40.

Assuming that the coupling members are in coupling position (Fig. 2) so that the driving and driven devices are in power-transmitting relation, rotation of the gear or pulley 1 in the direction indicated by the arrow in Fig. 2, rotates element 3 with its flange 7 in the same direction. Tooth 12 bearing on tooth 16 and tooth 13 bearing on tooth 17, tend to turn the coupling members respectively in the clockwise direction as viewed in Fig. 2. The spring 27 tends to hold the coupling members against this rotation however, and accordingly, so long as the load on the driven shaft 4 is less than the predetermined value as determined by the tension of the spring 27, the coupling members are held against rotation on their own axes, and accordingly the teeth on flange 7 drive the sub-base 21 along with it. The action is the same as though the coupling members were mounted immovably in this sub-base. The sub-base 21 being keyed to shaft 4, this shaft is rotated thereby. Should the load on the shaft 4 now be raised to such a value that the spring 27 is unable to prevent rotation of the coupling members on their own axes, these coupling members are turned on their own axes in a clockwise direction, ultimately tooth 11 cooperates with the tooth 15 and tooth 14 with the tooth 18, until finally the crank pins 25 and 26 are passed, by the thrust of 7 against 9 and 10, the right and left respectively of the line 32 of Fig. 3. As this occurs, the center line and tension of the spring 27 crosses the axes of the stub shafts 19 and 20, and from thence on the spring 27 urges these coupling members in the uncoupling direction, that is to say, to their positions in Fig. 3, rather than in the coupling direction as before. The teeth 15 and 16, and 17 and 18, are now entirely out of the path of the teeth 11 and 12, and 13 and 14, and the driven devices are therefore uncoupled from the driving devices. Furthermore, the coupling members are now held in this uncoupled position by the spring 27, i. e., against stops 35 and 36. To recouple or return the apparatus to the power-transmitting relation between the driving and driven devices, it is only necessary to return the coupling members counter-clockwise until the crank pins 25 and 26 have passed to the left and right respectively of the line 32 of Fig. 3. The spring 27 then urging the coupling members to their coupling positions, i. e. toward and against the stops 33 and 34 respectively. This may be done by means of a pin inserted in the recess 40 as before described. The continued or subsequent rotation of the flange 7 then brings tooth 12 into contact with tooth 16 and tooth 13 into contact with tooth 17, and thereupon the rotation of shaft 4 is started again, and this rotation continues assuming that the load on the shaft 4 has been restored to normal.

It will be observed that the thrust-resisting load imposed on the coupling members by the spring 27 falls in value as the coupling members are rotated from normal coupling position, clockwise, and the crank pins 25 and 26 approach the line 32; the effective lever arm is reduced in length as the cranks 23 and 24 move away from the normal coupling position of Fig. 3. When the axes of the crank pins stand exactly on this line 32, the spring 27 imposes no thrust-resisting load on the coupling members whatsoever, the tension of the spring then being directly at right angles to the thrust of 7 against the coupling members. The coupling members are then as free to turn under this thrust as though the spring 27 were absent. Hence the actual uncoupling is effected without load on the coupling members. Preferably however the spring 27 is given such a characteristic that during the first few degrees of rotation of the coupling members away from the stops 33 and 34 respectively, the tension of this spring increases somewhat more rapidly than the effective length of the lever arms is reduced; this permits some temporary overloading of the driven elements without an uncoupling of the driven from the driving devices; on the discontinuance of the temporary overloading, the spring 27 returns the coupling members to the stops 33 and 34.

It will be understood also that the teeth 11 to 18 are preferably gear teeth, that is to say, are so shaped as to make rolling contacts with their co-operating teeth respectively. Furthermore the number of teeth on each coupling member is not necessarily limited to two, and likewise the number of the teeth on the flange 7 is not necessarily limited to separated pairs or sets. Ordinarily however, in order to maintain rolling contact between the teeth so far as possible, and for adequate strength along with compactness, we have found that two teeth per coupling member are advantageous and sufficient, and usually we put on the flange 7 only so many teeth as are required in order to cause the functioning of the teeth on the coupling members; for example, two pairs of teeth on the flange 7 when there are two coupling members having two teeth each.

Referring now to Figs. 4 to 6: The housing 40, which may be regarded as mounted in a fixed position, has bearings 41 for the shaft 42 which, for the purposes of this description, may be regarded as a driven element. On this shaft is mounted a worm gear 43 driven by the worm 38 and carrying with it, around the axis of the shaft 42, the gear or pair of gears 44 which are so connected as to be forced to rotate together. The gears 44 constitute the planet or planets of a planetary or epicyclic gearing. A cooperating sun gear 45 is keyed to the shaft 42, while a second sun gear 46 is mounted loosely on this shaft; the latter sun gear 46 is the stationary gear. Two sun gears 45 and 46 have different numbers of teeth, the relative numbers of teeth depending on whether 42 is to rotate faster or slower than 43 and on the difference in speed desired between these two. It can be assumed for the present that the two ends of the gear 44, or the two connected gears 44, meshing respectively with 45 and 46, have equal numbers of teeth. For cooperation with the coupling member which holds the sun gear 46 stationary and the driving and driven devices in coupled or power-transmitting relation, this sun gear 46 is conveniently provided with an arm or sector 47, to which it may be connected by a sleeve as shown. The coupling member 48, keyed to the stub shaft 49, has a tooth or teeth (usually about two as before explained with respect to the device of Figs. 1 to 3) to engage with teeth on this sector 47. As before, a coiled spring 50 is connected to the coupling member 48 at 51 at one side of the axes of the coupling member; and also as before, the opposite end of the spring is carried at such a point 52 (in this instance attached to a wall of the casing 40) that the center line and tension of the spring crosses the axis of rotation of the coupling member as the coupling member is turned by sector 47 from its coupling position (Fig. 5) to its uncoupled position, and vice versa. Stop 53 on casing 40 is engaged by the coupling member 48 to limit the movement of the coupling member in the coupling direction under the pull of the spring 50 (see Fig. 5), and also is engageable by shoulder 54 on the coupling member to limit the rotation of the coupling member in the opposite direction, to some suitable uncoupling position.

Assuming the coupling member 48 to be in the position illustrated in Fig. 5, whereby turning of the sector 47 in the direction indicated by the arrow is prevented so long as the tension of spring 50 is not exceeded, and assuming further, that gear 46 has a lesser number of teeth than gear 45, it will be apparent that turning of the worm 38 in such a direction as to tend to turn sector 47 in the direction indicated by the arrow in Fig. 5, will cause sun gear 45, and thereby shaft 42, to be turned also, but at a lower speed than 43 and at a very much lower angular speed than the driving worm 38. The difference in speed is determined of course by the difference between the number of teeth on the gear 45 and the number of teeth on the gear 46, as before indicated; it can be further changed somewhat by making the number of teeth on one of the gears 44 different from the number of teeth on the other of these gears 44; the latter need not be equal as before assumed; such a difference is indicated in the drawings. So long as the load on shaft 42 is so low that the thrust of sector 47 against the coupling member 48 is not sufficient to turn 48 against the tension of spring 50, the device acts as though the sun gear were permanently fixed against rotation. When this thrust is exceeded however, sector 47 begins to turn in the direction of the arrow in Fig. 5, and thereby turns the coupling member 48; if the overload is sufficient, the coupling member is turned to such a point that the spring 50 becomes effective to urge it in the uncoupling direction, i. e. shoulder 54 toward stop 53, and the coupling is then broken as will be understood. The coupling is re-made, or re-set, by returning the coupling member 48 to the position in which it is shown in Fig. 5, or sufficiently near to that position to permit the spring 50 to complete the movement.

To restore the coupling members to the coupling position (and it will be understood that this arrangement is not necessarily limited in its application to the particular form of release apparatus illustrated in Figs. 4 and 5), we employ preferably a replacing element having such a lost motion connection with the coupling member that this replacing element is able to return the coupling member only to the point where the supporting and operating spring becomes effective to urge the coupling member to its normal coupling position; and preferably also such a lost motion connection that this replacing element can move the coupling member from its normal coupling position to only about the position where the spring first becomes effective to move the coupling member to its fully uncoupled position. The replacer element of Figs. 4 to 6 is of this nature. The handle 57 of the replacer is attached to a hollow member 58 rotatable on the hub 59 projecting from the housing 40 concentric with stub shaft 49. The lost motion connection is provided by the arcuate slot 60 in this member 59, and the pin 61 projecting from the hub 62 fastened on the end of the stub shaft. The end 63 of the slot, and the stop 64 for the handle 57 of the replacer, are so placed relatively that turning the handle 57 and member 58 from the uncoupled position to the coupled position of Fig. 5, carries the pin 61, and therewith the coupling member 48, to such a position that the spring 50 has only slightly more than become effective to turn the coupling member 48 into full coupled position, where it can be engaged by the sector 47 as the latter approaches the coupling member anew. Therefore if one should attempt to hold the coupling member 48 in coupled position manually while the driven devices are overloaded, substantially the full thrust of the sector 47 would be thrown on the replacer handle 57, and thus adequate notice of the conditions existing would be given. The opposite wall 65 of the slot is so placed as to permit the movement of the coupling member 48 to full coupling position, and is also so placed that by turning the replacer in the reverse direction this wall 65 will carry pin 61, and therewith coupling member 48, to a position in which the spring 50 becomes effective to complete the movement of the coupling member to the uncoupled position.

It will be understood that our invention is not limited to the details illustrated and described above, except as appears hereinafter in the claims.

We claim:

1. In apparatus of the kind described, a displaceable coupling member, driving and driven devices including a member engageable with the coupling member to couple the driving and driven devices in power-transmitting relation, mechanism for yieldingly urging the coupling member in a direction to engage the coupling member with said member engageable therewith and urging the coupling member in the opposite direction after the coupling member has been displaced to some certain point from its normal coupling position, and stops engageable by the coupling member to limit its movement in both directions, the coupling member and the said member engageable therewith being so related that the latter member can displace the coupling member to said point.

2. In apparatus of the kind described, a displaceable coupling member, driving and driven devices including a member engageable with the coupling member to couple the driving and driven member in power-transmitting relation, and a spring to support the coupling member against the thrust of the said member engageable therewith, said spring having such a characteristic that the coupling member can sustain a greater thrust when displaced slightly than when in its normal coupling position, but being so mounted as to urge the coupling member away from the member engageable therewith when the coupling member has been displaced to some further point from its normal coupling position, and said coupling member and the member engageable therewith being so related that the latter can displace the coupling member to said point.

3. In apparatus of the kind described, a rotatable coupling member, rotary driving and driven devices including a rotatable member engageable with the coupling member to couple the driving and driven devices in power-transmitting relation, a coiled spring bearing on the coupling member at one side of the axis of the latter, to support the coupling member against the thrust of said member engageable therewith while the coupling member is in normal coupling position, means carrying the opposite end of the spring at such a position that the tension of the spring on the coupling member passes across the axis of the coupling member as the coupling member is rotated by said member engageable therewith on the occurrence of an overload, the coupling member and the said member engageable therewith being so related that the latter rotates the coupling member so far, on the occurrence of a predetermined overload on the driven devices, that the thrust of the spring passes across said axis, a stop engageable by the coupling member to limit rotation of the coupling member in the coupling direction to a position in which the coupling member engages the said member which is engageable therewith, and a stop engageable by the coupling member to limit the rotation of the coupling member in the opposite direction to a position where the coupling member is not engageable with the said member engageable therewith to complete the power-transmitting connection.

4. In apparatus of the kind described, a rotatable coupling member, rotary driving and driven devices including a rotatable member engageable with the coupling member to couple the driving and driven devices in power-transmitting relation, a spring to support the coupling member against the thrust of the said member engageable therewith when the coupling member is in coupling position, said spring bearing on the coupling at one side of the axis of the coupling member and the opposite end of the spring being carried at such a position that the thrust of the spring on the coupling member passes across the axis of the coupling member as the latter is moved from power-transmitting position to release position, a stop engageable by the coupling member to limit the rotation of the coupling member in one direction to a position in which the coupling member engages with said member which is engageable therewith, and a stop engageable by the coupling member to limit the rotation of the coupling member in the opposite direction.

5. In apparatus of the kind described, driving and driven devices including an epicyclic speed-changing gearing, a rotatable coupling member engageable with the stationary gear thereof to hold said gear stationary against the thrust thereon, a spring bearing on the rotatable coupling member at a point at one side of the axis of the latter to hold the coupling member from rotation under the thrust thereon of said stationary gear, the point of bearing of the spring on the rotatable coupling member being such that the thrust of said spring on the coupling member is passed to the opposite side of the coupling member axis as the coupling member is rotated by said stationary gear on the occurrence of an overload greater than the spring is able to hold the coupling member against.

6. In apparatus of the kind described, driving and driven devices including an epicyclic speed-changing gearing, and a yielding displaceable and replaceable member to hold stationary the normally stationary gear of said epicyclic gearing.

7. In apparatus of the kind described, a displaceable coupling member, driving and driven devices including a member engageable with the coupling member to couple the driving and driven devices in power-transmitting relation, mechanism for yieldingly supporting the coupling member against the thrust of said member which is engageable therewith, said mechanism increasing the loading on the coupling member as the coupling member moves from some certain position into normal coupling position, and means to replace the coupling member in coupling position, said means comprising an element to move the coupling member to said certain position but no farther, the coupling member being free of said element to move from said certain position to normal coupling position.

8. In apparatus of the kind described, a displaceable coupling member, driving and driven devices including a member engageable with the coupling member to couple the driving and driven devices in power-transmitting relation, yielding means to move the coupling member from some certain position toward normal coupling position, and an element to move the coupling member to said certain position but no farther, the coupling member being free of said element to move from said certain position to normal coupling position.

9. In apparatus of the kind described, a displaceable coupling member, driving and driven devices including a member engageable with the coupling member to couple the driving and driven devices in power-transmitting relation, mechanism for yieldingly urging from a point where the coupling member engages the said member, the coupling member into normal coupling engagement with the said member which is engageable therewith, and for urging, from about the same point, the coupling member away from the said member engageable therewith, and an element having a lost motion connection with the coupling member to return the coupling member from uncoupled position to said point from which said mechanism can urge the coupling member into normal coupling position.

10. In apparatus of the kind described, a rotatable coupling dog, rotary driving and driven devices, one of said devices having a member engageable with said dog to couple the driving and driven devices in power-transmitting relation and the other of said devices having a dog-carrying member on which said dog is journalled, said single dog-carrying member constituting the sole carrier of said dog, and a spring connected to said dog at one side of the axis of rotation of the dog to support the dog against the thrust of said member engageable therewith while the dog is in normal coupling position, the point of connection of the spring with said dog being such that the said point passes to the opposite side of said axis of the dog as the dog is rotated by said member engageable therewith on the occurrence of an overload greater than the spring is able to resist.

11. In apparatus of the kind described, a plurality of rotatable coupling members, rotary driving and driven devices including a rotatable member engageable with said coupling members to couple the driving and driven devices in power-transmitting relation, and a single spring member bearing on all said rotatable coupling members, and bearing on each of said coupling members at one side of the axis of the respective coupling member, to support the coupling members against the thrust of said member engageable therewith while the coupling members are in normal coupling positions, the point of bearing of said spring member on each coupling member being such that the said point passes to the opposite side of the axis of the respective coupling member as the coupling members are rotated by said member engageable therewith on the occurrence of an overload greater than said spring member is able to support the coupling members against.

12. In apparatus of the kind described, a plurality of displaceable coupling members, driving and driven devices including a member engageable with said coupling members to couple the driving and driven devices in power-transmitting relation, mechanism for yieldingly supporting the coupling members against the thrust of said member which is engageable therewith and urging the coupling members away from the said member after the coupling members have been displaced to some certain points from their normal coupling positions, said coupling members and the member engageable therewith being so related that the latter can displace the coupling members to said points, and a single mechanism for returning all said coupling members to their coupling positions.

13. In apparatus of the kind described, a plurality of displaceable coupling members, driving and driven devices including a member engageable with said coupling members to couple the driving and driven devices in power-transmitting relation, mechanism for yieldingly supporting the coupling members against the thrust of said member which is engageable therewith, said coupling members being retained in uncoupled relation when once uncoupled by the occurrence of a predetermined overload, and a single mechanism for returning all said coupling members to their coupling positions.

14. In apparatus of the kind described, a plurality of rotatable coupling members, rotary driving and driven devices including a rotatable member engageable with the coupling members to couple the driving and driven devices in power-transmitting relation, spring means bearing on the rotatable coupling members at one side of the respective axes of the latter to support the coupling members against the thrust of the said member engageable therewith while the coupling members are in normal coupling position, the point of bearing of the spring on each coupling member being such that the said point passes to the opposite side of the respective coupling member axis as the respective coupling member is rotated by the said member engageable with the coupling members on the occurrence of an overload greater than said spring means is able to support the coupling members against and a rotatable member connected to all said coupling members to return the same toward the positions in which they engage with said member which is engageable with the coupling members.

15. In apparatus of the kind described, a plurality of rotatable coupling members, rotary driving and driven devices including a rotatable member engageable with the coupling members to couple the driving and driven devices in power-transmitting relation, spring means bearing on the rotatable coupling members at one side of the respective axes of the latter to support the coupling members against the thrust of the said member engageable therewith while the coupling members are in normal coupling position, the point of bearing of the spring on each coupling member being such that the said point passes to the opposite side of the respective coupling member axis as the respective coupling member is rotated by the said member engageable with the coupling members on the occurrence of an overload greater than said spring means is able to support the coupling members against, and a rotatable toothed member, located with the path of revolution of said coupling members, to return said coupling members toward their positions of engagement with said member which is engageable with said coupling members, said coupling members being provided with teeth engageable with the teeth of said toothed member.

16. In apparatus of the kind described, a displaceable coupling member, driving and driven devices, one of said devices including a power-transmitting shaft and the other including a power-transmitting wheel encircling the axial line of said shaft and arranged for power transmission adjacent its periphery, one of said devices also carrying said displaceable coupling member and the other including a member engageable with said coupling member to couple the driving and driven devices in power-transmitting relation, and mechanism for yieldingly supporting the coupling member against the thrust of said member which is engageable therewith and urging the coupling member away from the said member after the coupling member has been displaced to some certain point from its normal coupling position, said coupling member and the member engageable therewith being so related that the latter can displace the coupling member to said point.

17. In apparatus of the kind described, rotary driving and driven devices, one including a power-transmitting shaft and the other including a power-transmitting wheel encircling said shaft adjacent one end of the latter and arranged for power transmission adjacent its periphery, a rotatable coupling member located at the same side of said wheel as said shaft end, one of the first mentioned devices bearing said coupling member and the other including a member engageable with said coupling member to couple the driving and driven devices in power-transmitting relation, and mechanism for yieldingly supporting the coupling member against the thrust of said member which is engageable therewith and urging the coupling member away from the said member after the coupling member has been displaced to some certain point from its normal coupling position, said coupling member and the member engageable therewith being so related that the latter can displace the coupling member to said point.

18. In apparatus of the kind described, rotary driving and driven devices, one including a power-transmitting shaft and the other including a power-transmitting wheel encircling said shaft adjacent one end of the latter and arranged for power transmission adjacent its periphery, two rotatable coupling members located at the same side of said wheel as said shaft end and located at diametrically opposite sides of the axial line of said shaft, one of the first mentioned devices bearing said coupling members and the other including a member engageable with said coupling members to couple the driving and driven devices in power-transmitting relation, and a coiled spring, extending across the said end of the shaft, bearing on the rotatable coupling members at one side of their respective axes to support the coupling members against the thrust of the said member engageable therewith while the coupling members are in normal coupling positions, the point of bearing of the spring on each coupling member being such that the said point passes to the opposite side of the respective coupling member axis as the respective coupling member is rotated by the said member engageable with the coupling members on the occurrence of an overload greater than the spring is able to support the coupling members against.

19. In apparatus of the kind described, a rotatable coupling member, rotary driving and driven devices including a rotatable member engageable with the coupling member to couple the driving and driven devices in power-transmitting relation, said coupling member and said member engageable therewith being provided with co-operating surfaces so shaped as to make rolling contact with each other in the manner of gear teeth, and a spring bearing on the rotatable coupling member at one side of the axis of the latter to support the coupling member against the thrust of the said member engageable therewith while the coupling member is in normal coupling position, the point of bearing of the spring on the coupling member being such that the said point passes to the opposite side of the coupling member axis as the coupling member is rotated by the said member engageable therewith on the occurrence of an overload greater than the spring is able to support the coupling member against.

In testimony whereof, we have signed this specification.

GORDON M. PELTZ.
CHARLES A. JACKSON.